US012729719B2

(12) United States Patent
Mock et al.

(10) Patent No.: US 12,729,719 B2
(45) Date of Patent: Sep. 8, 2026

(54) SEAL ASSEMBLY FOR A WHEEL BEARING, COMPRISING A DIAGONAL CONTACT SURFACE, AND WHEEL BEARING

(71) Applicant: Schaeffler Technologies AG & Co. KG, Herzogenaurach (DE)

(72) Inventors: Christian Mock, Schweinfurt (DE); Darius Dlugai, Schwebheim (DE); Marco Krapf, Burkardroth (DE); Andreas Kaiser, Werneck (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 39 days.

(21) Appl. No.: 18/834,627

(22) PCT Filed: Dec. 13, 2022

(86) PCT No.: PCT/DE2022/100947
§ 371 (c)(1),
(2) Date: Jul. 31, 2024

(87) PCT Pub. No.: WO2023/151734
PCT Pub. Date: Aug. 17, 2023

(65) Prior Publication Data

US 2025/0035161 A1 Jan. 30, 2025

(30) Foreign Application Priority Data

Feb. 11, 2022 (DE) ..................... 10 2022 103 255.8

(51) Int. Cl.
*F16C 19/18* (2006.01)
*B60B 27/00* (2006.01)
(Continued)

(52) U.S. Cl.
CPC ...... *F16C 33/7883* (2013.01); *B60B 27/0073* (2013.01); *F16C 33/805* (2013.01);
(Continued)

(58) Field of Classification Search
CPC .......................... F16C 19/186; F16C 33/7823; F16C 33/7826; F16C 33/7883; F16C 33/80;
(Continued)

(56) References Cited

U.S. PATENT DOCUMENTS 5,975,534 A * 11/1999 Tajima ................ F16J 15/3264 277/572
6,170,992 B1 1/2001 Angelo et al.
(Continued)

FOREIGN PATENT DOCUMENTS

CN 108895091 A 11/2018
CN 110735861 A 1/2020
(Continued)

OTHER PUBLICATIONS

DE102017110115A1_Description.*

*Primary Examiner* — Phillip A Johnson

(57) ABSTRACT

A seal assembly for a bearing includes an inner support element arranged for connection to an inner bearing ring and an outer support element arranged for connection to an outer bearing ring. The inner support element has a contact surface formed at an angle between 0 degrees and 90 degrees relative to a horizontal the outer support element has a first seal element with a seal lip contacting the contact surface.

17 Claims, 4 Drawing Sheets

(51) Int. Cl.
*F16C 33/78* (2006.01)
*F16C 33/80* (2006.01)

(52) U.S. Cl.
CPC ........ *F16C 19/186* (2013.01); *F16C 2240/30* (2013.01); *F16C 2326/02* (2013.01)

(58) Field of Classification Search
CPC .......................... F16C 33/805; F16C 2240/30; F16C 2326/02; B60B 27/0073
See application file for complete search history.

(56) References Cited

U.S. PATENT DOCUMENTS

| | | | | |
|---|---|---|---|---|
| 7,232,129 | B2 | 6/2007 | Kobayashi | |
| 7,942,584 | B2 * | 5/2011 | Norimatsu | F16C 33/7883 277/549 |
| 8,016,294 | B2 * | 9/2011 | Shibayama | F16C 33/7883 277/572 |
| 2021/0372476 | A1 | 12/2021 | Kim et al. | |

FOREIGN PATENT DOCUMENTS

| | | | | | |
|---|---|---|---|---|---|
| DE | 102014203210 | A1 | | 8/2015 | |
| DE | 102016213799 | A1 | | 5/2017 | |
| DE | 102017110115 | A1 | | 11/2018 | |
| DE | 102017114486 | A1 | | 1/2019 | |
| DE | 102017123170 | A1 | | 4/2019 | |
| GB | 2526545 | A | * | 12/2015 | F16C 33/805 |
| JP | 2003240003 | A | | 8/2003 | |
| JP | 2004068844 | A | | 3/2004 | |
| JP | 2007285374 | A | * | 11/2007 | F16C 41/007 |
| JP | 2008128378 | A | * | 6/2008 | F16C 33/7883 |
| JP | 2015152030 | A | | 8/2015 | |
| JP | 2018066448 | A | | 4/2018 | |
| JP | 2019074102 | A | | 5/2019 | |
| JP | 6534458 | B2 | | 6/2019 | |
| KR | 20130087875 | A | | 8/2013 | |

* cited by examiner

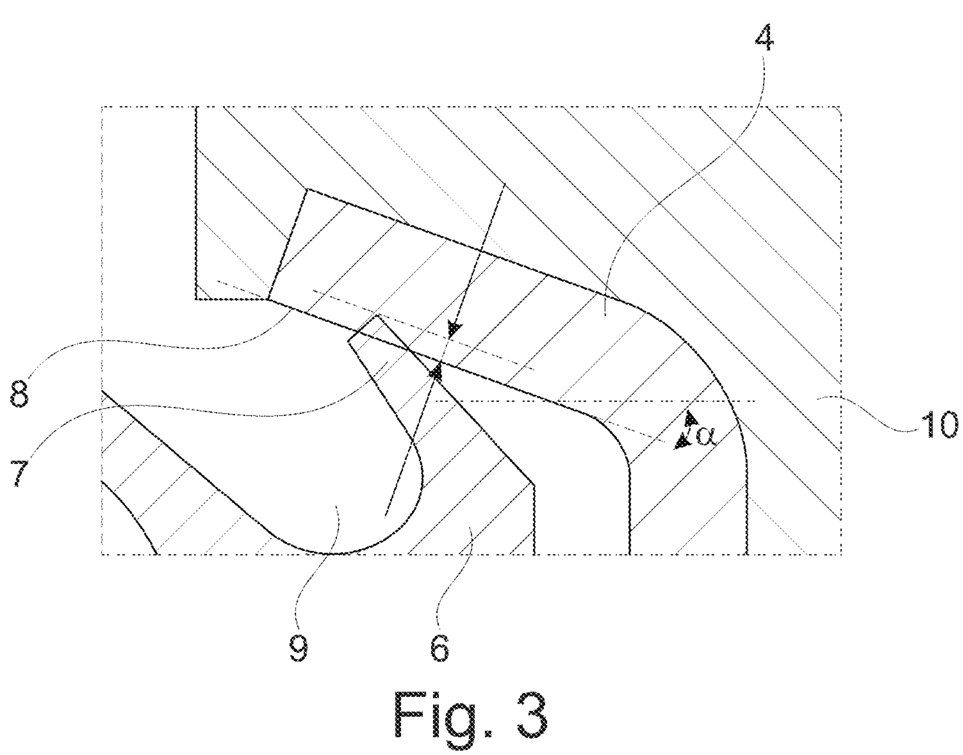
Fig. 3
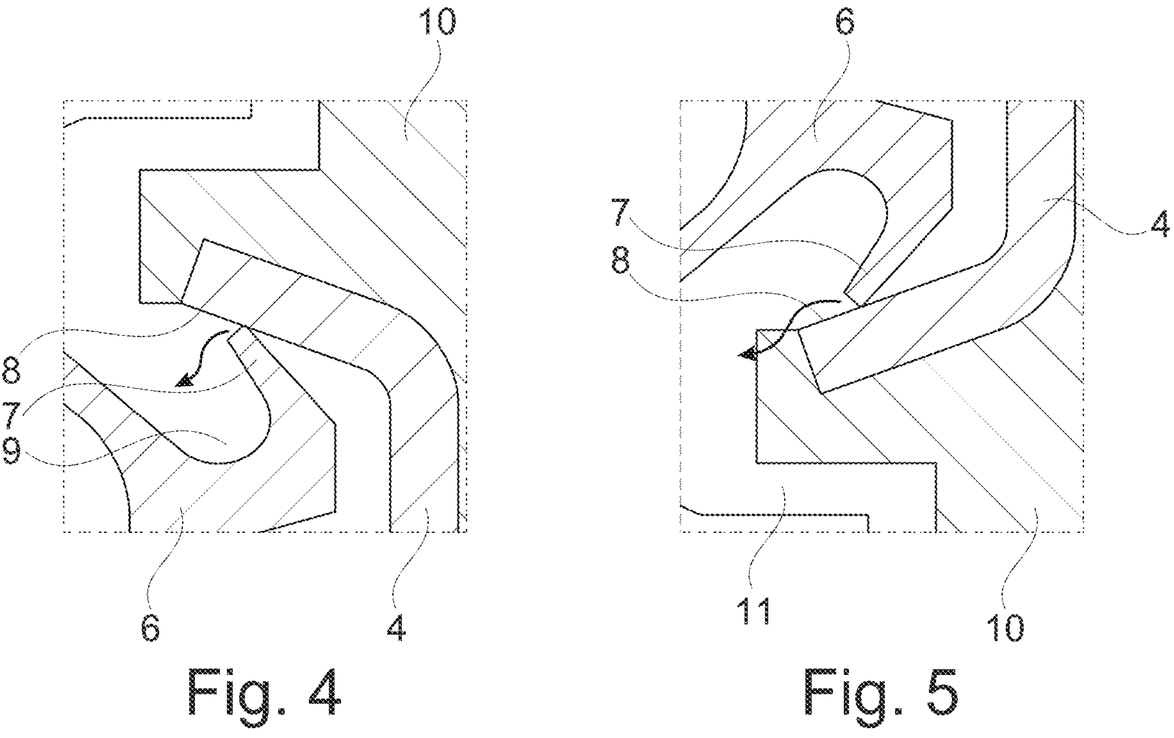
Fig. 4
Fig. 5

SEAL ASSEMBLY FOR A WHEEL BEARING, COMPRISING A DIAGONAL CONTACT SURFACE, AND WHEEL BEARING

CROSS-REFERENCE TO RELATED APPLICATIONS

This application is the United States National Phase of PCT Appln. No. PCT/DE2022/100947 filed Dec. 13, 2022, which claims priority to German Application No. DE102022103255.8 filed Feb. 11, 2022, the entire disclosures of which are incorporated by reference herein.

TECHNICAL FIELD

The present disclosure relates to a seal assembly for sealing a (rolling) bearing. The seal assembly has a seal element with at least one seal lip which sealingly lies against an associated contact surface. The present disclosure also relates to a wheel bearing.

BACKGROUND

To support a rotating component, e.g., a shaft, rolling/plain bearings are used. The rolling elements in such bearings are susceptible to contamination in the form of foreign particles or liquids. The interior of these bearings must therefore be tightly sealed to prevent the ingress of contaminants or liquid. Typically, such a sealing effect, especially in the wheel bearings of a motor vehicle, is achieved by contact between several dynamic seal lips of a first seal element and a rotating counter-running surface.

For example, seal assemblies for sealing a rolling bearing between a first and a second bearing part are known from JP 2015-152 030 A and KR 10-2013 0 087 875. The seal assemblies have a stationary sealing disk with at least one seal lip, which is in axial sealing contact with a contact surface of a second rotating sealing disk, and a radial gap seal. The design of the overlap of the seal lip or the seal with the rotating contact surface depends on the (axial) position of a centrifugal disc, which is subject to tolerances. In particular, the effect of the axially aligned seal lip is sensitive to the mutual positioning of the stationary sealing disc and the rotating sealing disc. This means that the position tolerances of the centrifugal disc have a direct impact on the overlap of the axial seal lips. To cushion/mitigate the position tolerances, a nominal seal lip overlap must be defined. A minimum overlap between a seal lip and the contact or counter surface is required to ensure sufficient sealing function, whereas a maximum overlap should not be exceeded to keep the friction between the two components as low as possible.

From DE 10 2917 110 115 A1, a further seal assembly is known which achieves a sealing effect by means of a seal lip which is in radial contact with an opposing contact surface. However, such a radial alignment of the seal lip makes it difficult for water which occurs at the seal lip to flow away or drain off in the axial direction.

SUMMARY

The present disclosure provides a seal assembly for sealing a bearing including an inner and an outer bearing ring having a running surface/counter-running surface or contact surface of a rotating support element, against which a seal lip sealingly lies, formed at an angle between 0° and 90°, relative to a horizontal, in the direction of the outer bearing ring. This makes it possible to provide a seal assembly in which a tolerance-dependent positioning of a centrifugal disc has a smaller influence/effect on the seal lip overlap between a seal lip and an opposing contact surface, i.e., the theoretical overlap of the seal lip and the contact surface.

The disclosure therefore relates to a seal assembly for sealing a bearing, e.g., a wheel bearing, with an inner rotatable bearing ring and an outer fixed bearing ring. The seal assembly includes an inner support element/sealing disk connected to the inner bearing ring and an outer support element/sealing disk connected to the outer bearing ring. A first seal element with at least one seal lip is formed on the outer support element, which sealingly lies against a contact surface/running surface/counter-running surface of the inner support element. Furthermore, the contact surface of the inner support element in the installed state of the seal assembly is formed at an angle between 0° and 90°, relative to a horizontal, in the direction of the outer bearing ring.

In other words, the seal assembly according to the disclosure has two support elements, each of which is connected to an inner or outer (with respect to the axis of the rotatably mounted component) bearing ring. The support element arranged on the outer, fixed bearing ring has a seal element, which in turn has at least one radially or axially protruding/aligned seal lip. The inner support element has an obliquely formed contact surface with which the at least one seal lip can be brought into sealing contact. The oblique alignment of the contact surface of the outer support element occurs in the direction of the outer bearing ring, at an angle between 0° and 90° to a horizontal. A theoretical angle of 0° describes an orientation of the contact surface in which the contact surface corresponds to the horizontal. Since the contact surface of the rotating sealing disc is arranged at an angle, the overlap of the seal lip is also angled or oblique.

This oblique arrangement of the contact surface for the seal lip reduces the tolerance- or position-related influence of the centrifugal disc and thus of the rotating support element of the seal assembly. An axial position shift of the centrifugal disc (due to tolerances) therefore has a smaller effect on the resulting overlap between the seal lip and the associated contact surface of the rotating support element. This inclined contact surface and the resulting inclined seal lip overlap can also be used to reduce a nominal seal lip overlap, thus keeping friction losses low while maintaining a sufficiently high sealing effect. Thus, the seal lip overlap described above is optimized with regard to sealing ability and friction. This may be done independently from the tolerances of the centrifugal disc.

According to an example embodiment, the seal lip lies on the contact surface of the inner support element in the radial direction.

In other words, the seal lip, which can be brought into contact with the oblique/angled contact surface of the inner support element, is radially formed. This means that the seal lip is slotted in the radial direction.

A radial design of the seal lip in combination with the associated, inclined contact surface of the counter-rotating support element ensures that no contaminated water accumulates in the area of the seal lip overlap. Contaminated water at the contact point of the seal lip above the rotation axis and also below the rotation axis of the rotating component is able to drain away directly. This means that no contaminated water reservoir is formed at the sealing contact in comparison to an axial design of the seal lip.

In a further aspect of the disclosure, the angle between the contact surface of the inner support element and the horizontal is approximately 30°.

An arrangement of the contact surface of the inner support element at an angle of approximately 30° between the contact surface of the inner support element and a horizontal, in the direction of the outer bearing ring, has the consequence that an axial position change (of the centrifugal disc or the rotating support element) is only approximately half converted into a change in the seal lip overlap. Thus, the influence of an axial displacement of the centrifugal disc (due to tolerances) is reduced by about half compared to an axial contact between the seal lip and the contact surface (i.e., at an angle of 90° between the contact surface and a horizontal), which reduces the chance of a sealing effect that is too low or a frictional torque that is too high.

According to a further embodiment of the disclosure, the first seal element has at least one collecting chamber which is designed and intended to collect contamination and/or liquid.

In other words, the first seal element forms a notch-shaped collecting chamber which extends along the entire circumference of the seal element and is intended to collect impurities. This may prevent splash water and impurities such as dust or other foreign particles from entering/penetrating into the interior of the bearing. Accordingly, any impairment of the bearing's functionality is counteracted.

According to a further embodiment of the disclosure, the two support elements of the seal assembly are each force-fit connected to the two bearing rings associated with them.

In other words, the outer support element, which has the first seal element, is force-fitted to the outer bearing ring of the rolling bearing or wheel bearing. At the same time, the inner support element is force-fitted to the inner bearing ring. Such a force-fit connection is achieved, for example, by a press fit. This ensures a secure and relatively strong connection between the components while keeping manufacturing costs low.

In a further aspect of the disclosure, the inner support element of the seal assembly has a second seal element. The additional seal element on the inner support element makes it possible to geometrically influence the sealing space between the two (counter-running) support elements and additionally protects the inner support element from external influences.

In a further aspect of the disclosure, the two support elements are arranged axially such that a seal gap is formed between the first and the second seal element.

This seal gap between the two support elements may extend mostly axially, thereby increasing the axial path for impurities/contaminant particles into the interior of the bearing. Furthermore, this effect can be increased by a stepped course of the seal gap in the radial direction.

According to a further embodiment of the disclosure, at least the second seal element has at least one trapezoidal sealing projection and at least the first seal element has at least one trough-shaped recess associated therewith.

In other words, at least one trapezoidal or rectangular sealing projection is integrally formed on at least the second seal element and is aligned horizontally. In this embodiment, at least the first seal element has at least one trough-shaped recess which is formed opposite to the sealing projection of the second seal element and is associated therewith. In the installed state of the seal assembly according to the disclosure, the trough-like recess encompasses/encloses the associated sealing projection, while maintaining a sufficiently wide seal gap between the two support elements so that an unhindered rotational movement is ensured.

In a further aspect of the disclosure, the seal gap is designed in the form of a labyrinth structure consisting of a plurality of trapezoidal sealing projections arranged one behind the other and the respective associated trough-shaped recesses.

In other words, a seal gap is created between the two support elements by an arrangement one behind the other of several sealing projections and the associated recesses, e.g., in the radial or axial direction, which has a labyrinth shape/serpentine shape. This arrangement one behind the other occurs in the axial or radial direction of the (mounted) seal assembly.

Such a design of the seal gap between the two support elements additionally increases the distance/path/length of the seal gap into the interior of the bearing, which makes it more difficult for (contaminant) particles to penetrate.

The disclosure further relates to a wheel bearing for a motor vehicle with the seal assembly described above.

BRIEF DESCRIPTION OF THE DRAWINGS

The present disclosure and the technical field are explained in more detail below with reference to the figures. It should be noted that the disclosure is not intended to be limited by the exemplary embodiments shown. For example, unless explicitly stated otherwise, it is also possible to extract sub-aspects of the subject matter explained in the figures and to combine them with other components and knowledge from the present description and/or figures. It should be noted that the figures and the proportions shown are only schematic in nature. The same features are referenced with the same reference symbols. It is also pointed out that the features of the individual embodiments can be interchanged and can occur in a certain combination.

FIG. 3 is an enlarged (lateral) cross-sectional view through the seal lip overlap of the seal assembly according to the first example embodiment.

FIG. 4 is an enlarged (lateral) cross-sectional view through the sealing contact of the seal lip above a rotation axis of the seal assembly according to the first embodiment.

FIG. 5 is an enlarged (lateral) cross-sectional view through the sealing contact of the seal lip below a rotation axis of the seal assembly according to the first embodiment.

DETAILED DESCRIPTION

The present disclosure and example embodiments are described below with reference to the figures.

Figure 1:
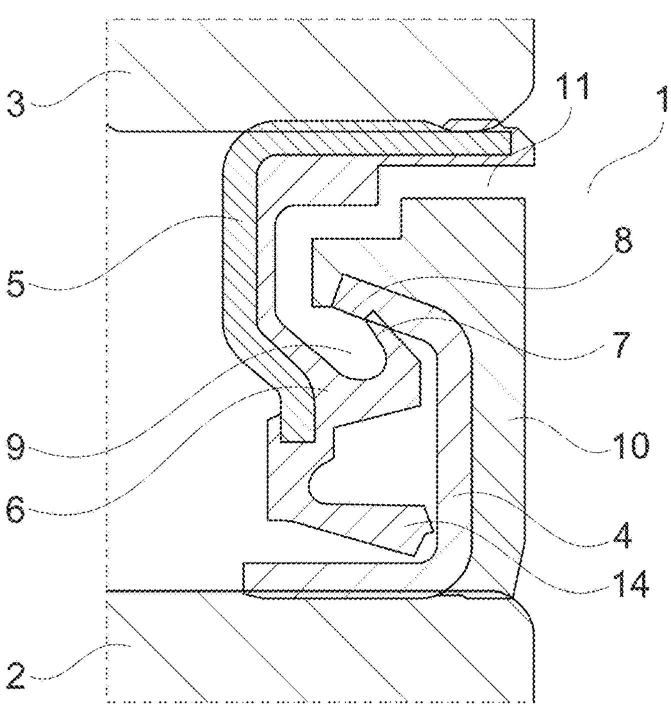
FIG. 1 is a (lateral) cross-sectional view through the seal assembly according to a first example embodiment.

FIG. 1 shows a (lateral) cross-sectional view through the seal assembly 1 according to a first example embodiment. In this view, the seal assembly 1 is arranged above a rotation axis and has an outer support element 5 (with respect to the rotation axis), which is connected to an outer bearing ring 3 of a rolling or wheel bearing. In addition, the seal assembly 1 has an inner support element 4 which is connected to an inner bearing ring 2. In this cross-sectional view, the outer support element 5 has an L-shaped profile and the inner support element 4 has an almost C-shaped profile. Both support elements 4, 5 are arranged relative to each other in such a way that they form a sealing space between them.

The outer support element 5 further has, on the side facing the sealing chamber, a first seal element 6 with a seal lip 7, a radial end piece 14 and a collecting chamber 9. The seal lip 7 is aligned radially in the direction of the outer bearing ring 3 and is in sealing contact with an obliquely angled contact surface 8 of the inner support element 4. In the illustrated embodiment of the seal assembly 1, the contact surface 8 for the seal lip 7 is formed at an angle of approximately 30° to a horizontal, in the direction of the outer bearing ring. Accordingly, the seal lip 7 rests on this inclined contact surface 8 of the inner support element 4. The radial end piece 14 of the first seal element is formed on the side facing the inner bearing ring 2 and extends in the axial direction to the inner support element 4, thereby creating an axial gap seal. Furthermore, a second seal element is formed on the side of the inner support element 4 facing away from the sealing chamber. Both seal elements 6, 10 are arranged relative to one another in such a way that they form a seal gap 11 between them, which runs in a step-like manner.

Figure 2:
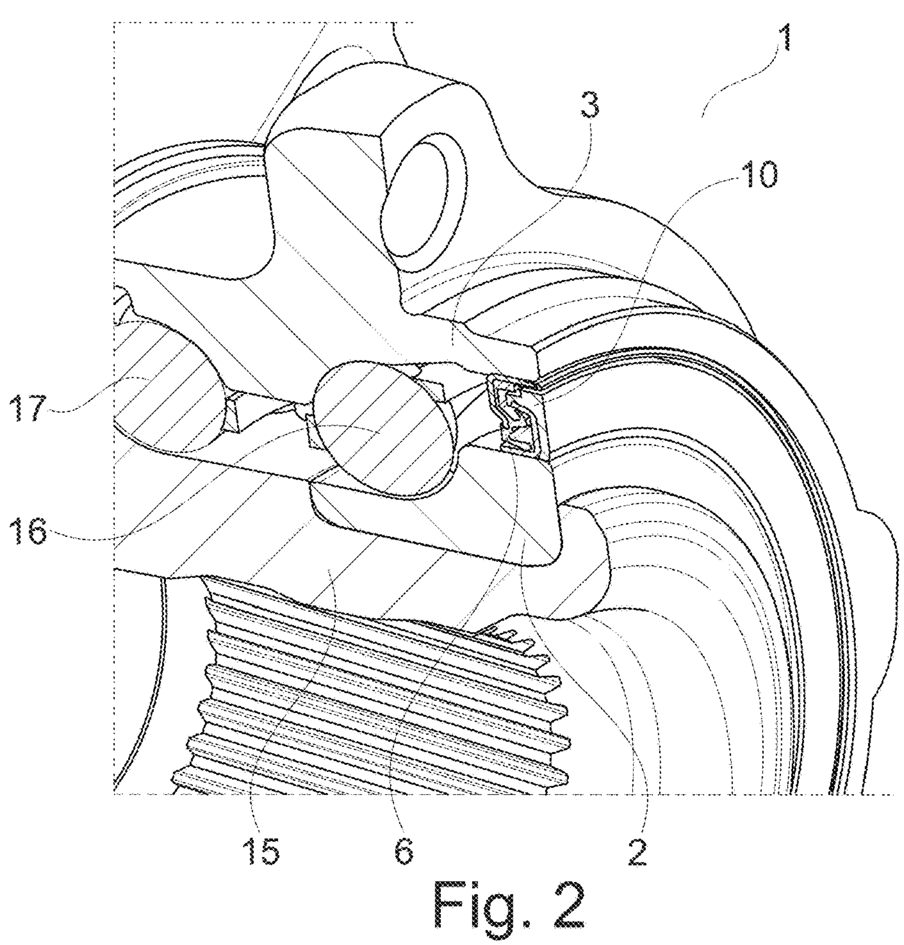
FIG. 2 is an isometric cross-sectional view through the transmission side of a wheel bearing with the assembled seal assembly according to the embodiment shown in FIG. 1.

FIG. 2 shows an isometric cross-sectional view through the transmission side of a wheel bearing with the mounted seal assembly 1 according to the embodiment shown in FIG. 1. The wheel bearing shown includes the outer bearing ring 3, which in this version is designed as an axle body, and a rotatable inner bearing ring 2, which is connected to a wheel flange 15. A first and second row of rolling elements 16, 17 are arranged between the inner bearing ring 2 and the outer bearing ring 3. In this illustration, the first row of rolling elements 16 faces the transmission side and the seal assembly 1 according to the first embodiment from FIG. 1, with a first seal element 6 and a second (transmission-side) seal element 10 is arranged next to this first row of rolling elements 16.

FIG. 3 shows an enlarged (lateral) cross-sectional view through the seal lip overlap of the seal assembly 1 according to the first example embodiment. In particular, the oblique course of the contact surface 8 of the inner support element 4 with the second seal element 10 can be seen, against which the seal lip 7 of the first seal element 6 sealingly or tightly lies or rests. Furthermore, the collecting chamber 9, which in this view is arranged below the seal lip 7, is shown for collecting contaminants or liquids. For illustration purposes, a number of dashed lines are shown in this illustration. The two oblique lines running parallel to each other illustrate an overlap of the seal lip 7 and the oblique contact surface 8. Only a theoretical seal lip overlap is shown, which differs from the actual shape of the seal lip 7 in the installed state. Another horizontal dashed line illustrates the oblique course of the contact surface 8, which runs at an angle α relative to the horizontal.

FIGS. 4 and 5 each show an enlarged (lateral) cross-sectional view through the sealing contact of the seal lip 7 of the seal assembly 1 according to the first embodiment, with the inner support element 4 and the two seal elements 6, 10. The radially aligned seal lip 7 is in contact with the obliquely formed contact surface 8 of the inner support element 4. FIG. 4 shows the sealing contact of the seal lip 7 with the inclined contact surface 8 above a rotation axis of a rolling/wheel bearing, whereas FIG. 5 shows a view of the sealing contact below the same rotation axis. Furthermore, in both views, a drainage direction of contaminated water within the seal assembly 1 is shown by an arrow. Due to the inclined contact surface 8, no contaminated water collects at the contact between the seal lip 7 and the contact surface 8, but instead is forced to flow into the collecting chamber 9 in the case of contact above the axis of rotation or, in the case of contact below the axis of rotation, along the contact surface 8 in the direction of the seal gap 11 between the two seal elements 6 and 10. This ensures a direct drainage of contaminated water, which accumulates on the seal lip, in an axial direction.

Figure 6:
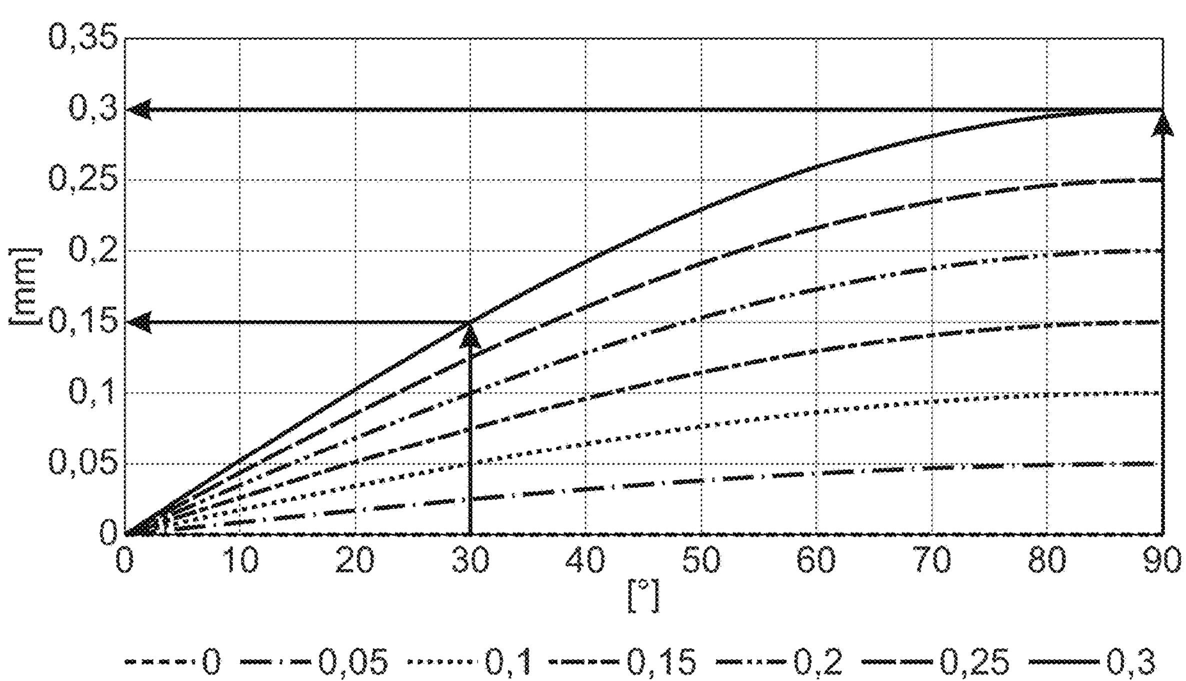
FIG. 6 is a diagram showing the dependency between a change in the seal lip coverage and an angle of the contact surface at different axial position changes for the seal assembly according to the disclosure.

FIG. 6 shows a diagram which illustrates the dependence between a change in the seal lip coverage and an angle of the inclined contact surface 8 of the inner support element 4 at different axial position changes for the seal assembly 1 according to the disclosure. The angle α between 0° and 90° is shown on the contact surface 8 with respect to a horizontal line on the x-axis of the diagram and each of the seven curves of the illustrated family of curves indicates an axial change in position of the centrifugal disc or the inner support element 4 with respect to the outer support element 5 of the seal assembly 1. The individual curves each represent an axial position change between 0 mm (lowest horizontal curve) and 0.3 mm (top curve). A predetermined angle α at a given axial position change is associated with a change in the seal lip overlap (in mm), which is entered on the y-axis of the diagram. At an angle of the contact surface 8 of, for example, 90°, i.e., a vertically extending contact surface 8, an axial position change of 0.3 mm of the rotating and stationary components relative to each other leads to a change in the seal lip overlap of 0.3 mm. Thus, an axial position change is 100% converted into a change in the coverage of the seal lip 7. However, an oblique or angled alignment of the contact surface 8 with respect to a horizontal line leads to a smaller effect of the axial position change. For example, an axial position change of 0.3 mm with a contact surface 8 which is aligned at an angle of 30° to the horizontal only leads to a change in the seal lip overlap of 0.15 mm. The influence of the axial position change is thus halved compared to the case of the vertical contact surface 8.

Figure 7:
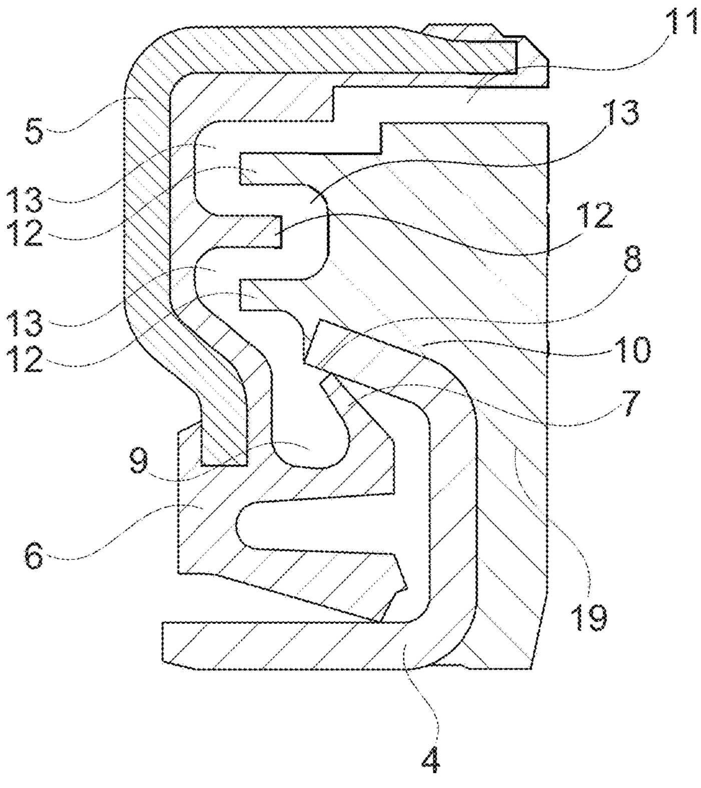
FIG. 7 is a (lateral) cross-sectional view through the seal assembly according to a second example embodiment.

FIG. 7 shows a (lateral) cross-sectional view through the seal assembly 1 according to a second example embodiment. The arrangement/design of the two support elements 4, 5, the seal lip 7 and the inclined contact surface 8 corresponds to their arrangement in the first embodiment (see FIG. 1). In this second embodiment of the seal assembly 1, the first seal element 6 has two trough-like recesses 13, into each of which a rectangular sealing projection 12 of the second seal element engages. Between the two sealing projections 12 of the second seal element, a further recess 13 is formed, which in turn encompasses a further sealing projection 12 on the side of the first seal element 6. The arrangement of the sealing projections 12 and the recesses 13 takes place alternately in the axial direction. Due to these geometries, the seal gap 11 between the two seal elements 6, 10 extends in a labyrinth-like/serpentine manner through the seal assembly 1 and ends in the collecting chamber 9. Furthermore, in this embodiment, the inner support element 4 has, outside the sealing contour, a (magnetic) encoder 19, which is provided in particular for an ABS signal of the wheel bearing.

Figure 8:
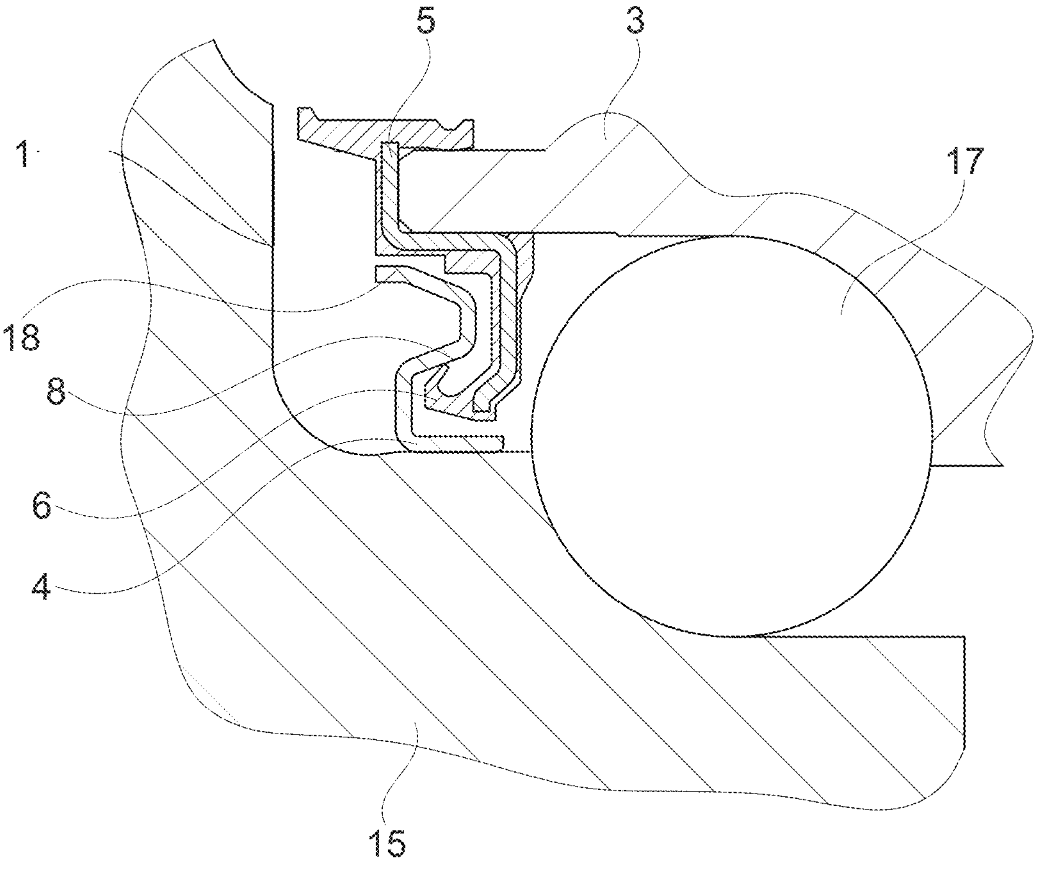
FIG. 8 is a (lateral) cross-sectional view through the wheel side of a partially shown wheel bearing with a mounted seal assembly according to a third example embodiment.

FIG. 8 shows a (lateral) cross-sectional view through the wheel side of the partially shown wheel bearing from FIG. 2, with a mounted seal assembly 1 according to a third example embodiment. In this view, the seal assembly 1 is arranged between a (stationary) outer bearing ring 3, e.g., in the form of an axle body, and a (rotating) wheel flange 15 as an inner bearing ring. In addition, the second rolling element region 17 from FIG. 2 can be seen between the outer bearing ring 3 and the wheel flange. The outer support element 5 of the seal assembly 1 is connected to the outer bearing ring 3 and the inner support element 4 is connected to the wheel flange 15. The inner support element 4 of the seal assembly 1 according to the third embodiment does not have an additional second seal element or rubber coating and also has a different contour. In this embodiment, the inner support element 4 extends above the inclined contact surface 8 in the direction of the outer bearing ring 3 and ends in an outer end piece which is bent and faces opposite the sealing chamber.

REFERENCE NUMERALS

1 Seal assembly
2 Inner bearing ring
3 Outer bearing ring
4 Inner support element
5 Outer support element
6 First seal element
7 Seal lip
8 Contact surface
9 Collecting chamber
10 Second seal element
11 Seal gap
12 Sealing projection
13 Recess
14 Radial end piece
15 Wheel flange
16 First row of rolling elements
17 Second row of rolling elements
18 Outer end piece
19 Encoder

The invention claimed is:

1. A seal assembly for sealing a bearing comprising an inner bearing ring and an outer bearing ring, the seal assembly having:

an inner support element connected to the inner bearing ring;

an outer support element connected to the outer bearing ring; and a first seal element with at least one seal lip formed on the outer support element, the at least one seal lip sealingly lying against an inclined contact surface of the inner support element; and the inclined contact surface of the inner support element in an installed state of the seal assembly is formed at an angle greater than 0° and less than 90°, relative to a horizontal, in a direction of the outer bearing ring; and a contact surface of the outer support element is inclined at an angle between 0° and 90° relative to the horizontal; and wherein the angle between the contact surface of the inner support element and the horizontal is a maximum of 30°.

2. The seal assembly according to claim 1, wherein the seal lip sealingly lies against the contact surface in a radial direction.

3. The seal assembly according to claim 1, wherein the first seal element has at least one collecting chamber which is designed and intended to collect contaminants or liquids.

4. The seal assembly according to claim 1, wherein the inner and outer support elements are each force-fit connected to the associated inner and outer bearing rings.

5. The seal assembly according to claim 1, wherein the inner support element has a second seal element.

6. The seal assembly according to claim 5, wherein the inner and outer support elements are arranged axially such that a seal gap is formed between the first seal element and the second seal element.

7. The seal assembly according to claim 6, wherein at least the second seal element has at least one trapezoidal or rectangular sealing projection and at least the first seal element has at least one trough-shaped recess associated with the sealing projection.

8. The seal assembly according to claim 7, wherein the seal gap is formed as a labyrinth structure comprising a plurality of trapezoidal sealing projections and the respectively associated trough-shaped recesses arranged one behind the other.

9. A wheel bearing for a motor vehicle, comprising the seal assembly according to claim 1.

10. A seal assembly for a bearing comprising:

an inner support element arranged for connection to an inner bearing ring, the inner support element comprising an inclined contact surface formed at an angle of greater than 0 degrees and not exceeding 30 degrees relative to a horizontal; and an outer support element arranged for connection to an outer bearing ring, the outer support element comprising a first seal element comprising a seal lip contacting the inclined contact surface, the seal lip inclined at an angle between 0 degrees and 90 degrees relative to the horizontal.

11. The seal assembly of claim 10, wherein the seal lip sealingly lies against the inclined contact surface in a radial direction.

12. The seal assembly of claim 10, wherein the first seal element further comprises a collecting chamber for collecting contaminants or liquids.

13. The seal assembly of claim 10, wherein:

the inner support element is arranged to be force-fit into the inner bearing ring; and the outer support element is arranged to be force-fit into the outer bearing ring.

14. The seal assembly of claim 10, wherein the inner support element further comprises a second seal element.

15. The seal assembly of claim 14, wherein:

the first seal element further comprises a trough-shaped recess; and the second seal element comprises a trapezoidal sealing projection or a rectangular sealing projection extending at least partially into the trough-shaped recess.

16. The seal assembly of claim 14 further comprising a seal gap arranged between the first seal element and the second seal element.

17. The seal assembly of claim 16, wherein the seal gap is formed as a labyrinth structure comprising a plurality of trapezoidal sealing projections, each one of the plurality of trapezoidal sealing projections extending at least partially into a one of a plurality of trough-shaped recesses.

* * * * *